United States Patent [19]

Lotsch et al.

[11] Patent Number: 4,707,548

[45] Date of Patent: Nov. 17, 1987

[54] BISISOINDOLINE PIGMENTS

[75] Inventors: Wolfgang Lotsch, Beindersheim; Gustav Bock, Neustadt; Peter Neumann, Wiesloch, all of Fed. Rep. of Germany

[73] Assignee: BASF Aktiengesellschaft, Ludwigshafen, Fed. Rep. of Germany

[21] Appl. No.: 821,972

[22] Filed: Jan. 24, 1986

[30] Foreign Application Priority Data

Feb. 5, 1985 [DE] Fed. Rep. of Germany ....... 3503776

[51] Int. Cl.$^4$ ........................................... C07D 403/14
[52] U.S. Cl. .................... 544/284; 544/180; 544/215; 544/296; 544/300; 546/155; 546/273; 548/156; 548/159; 548/181; 548/217; 548/219; 548/444; 548/460
[58] Field of Search .............. 544/284, 296, 180, 215, 544/300; 546/155, 273; 548/156, 159, 181, 217, 219, 444, 460

[56] References Cited

U.S. PATENT DOCUMENTS 4,223,152 9/1980 Fujii et al. ............................ 546/273
4,508,903 4/1985 Heiss ................................... 548/156
4,564,680 1/1986 Rolf et al. ............................ 546/155

Primary Examiner—Glennon H. Hollrah
Assistant Examiner—James H. Turnipseed
Attorney, Agent, or Firm—Oblon, Fisher, Spivak, McClelland & Maier

[57] ABSTRACT

Novel bisisoindoline pigments of the formula (I)

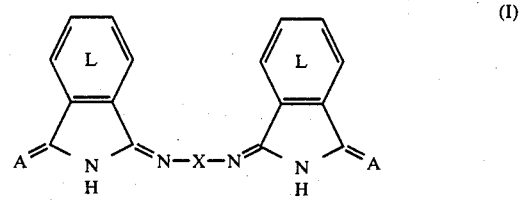

where the radicals A are identical or different radicals of a methylene-active compound, X is a divalent radical and the rings L are each unsubstituted or substituted, possess good fastness properties and are therefore suitable for a very wide range of applications, for example for pigmenting plastics, printing inks and surface coatings.

11 Claims, No Drawings

BISISOINDOLINE PIGMENTS

SUMMARY OF THE INVENTION

The present invention relates to bisisoindoline pigments of the formula (I)

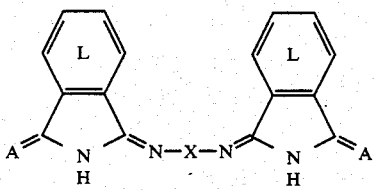

where the radicals A are identical or different radicals of a methylene-active compound, X is a divalent radical and the rings L are each unsubstituted or substituted.

DESCRIPTION OF THE PREFERRED EMBODIMENTS

The rings L are unsubstituted or monosubstituted, disubstituted, trisubstituted or tetrasubstituted, for example by halogen, preferably chlorine or bromine, $C_1$–$C_6$-alkyl, in particular methyl or ethyl, $C_1$–$C_6$-alkoxy, such as methoxy or ethoxy, carboxyl, nitro and/or carbamyl.

The radicals A= are of the formulae (II) to (VIb):

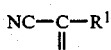 (II)

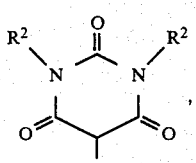 (III)

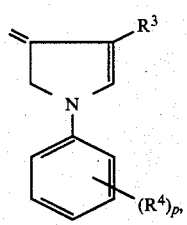 (IV)

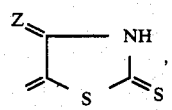 (V)

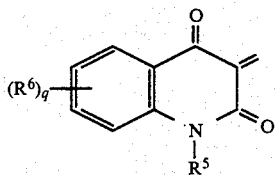 (VIa)

or

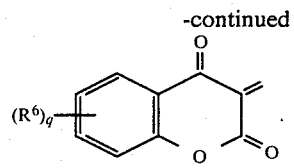 (VIb)

In formula (II), $R^1$ is a radical which activates the methylene group, eg. cyano; carbamyl which is unsubstituted or substituted by $C_1$–$C_6$-alkyl, benzyl, naphthyl or phenyl, where phenyl, benzyl and naphthyl may be further substituted by, for example, chlorine, bromine, $C_1$–$C_6$-alkyl, $C_1$–$C_6$-alkoxy, nitro, trifluoromethyl, $C_1$–$C_6$-alkylcarbonyl, in particular by acetyl, cyano, $C_1$–$C_6$-alkylamino, benzylamino, phthalimidyl, carbamyl or $C_1$–$C_6$-alkoxycarbonyl; $C_1$–$C_6$-alkylcarbonyl, preferably acetyl; benzoyl, $C_1$–$C_6$-alkoxycarbonyl, benzyloxycarbonyl or phenoxycarbonyl, benzoyl, benzyl and phenoxy being unsubstituted or substituted hy halogen, such as chlorine or bromine, nitro, $C_1$–$C_6$-alkyl, $C_2$–$C_7$-alkanoylamino or phthalimidyl; phenyl which is unsubstituted or substituted by halogen, in particular chlorine or bromine, nitro, cyano or trifluoromethyl; or a heterocyclic radical of the formula

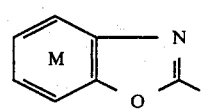 (VIIa)

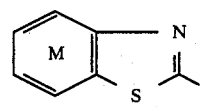 (VIIb)

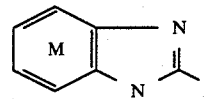 (VIIc)

or

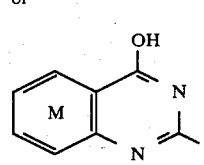 (VIId)

The ring M in formulae (VIIa) to (VIId) can be further substituted, for example by halogen, such as chlorine or bromine, nitro, $C_1$–$C_6$-alkyl and/or $C_1$–$C_6$-alkoxy, preferably by chlorine, bromine, methyl, ethyl, methoxy or ethoxy.

In formulae (III) to (VIb), the radicals $R^2$ independently of one another are each hydrogen or $C_1$–$C_6$-alkyl, or each phenyl which is unsubstituted or substituted by halogen, such as chlorine or bromine, $C_1$–$C_6$-alkyl, $C_1$–$C_6$-alkoxy or nitro, or are each α- or β-naphthyl, $R^3$ is $C_1$–$C_6$-alkyl, preferably methyl, amino, benzylamino, carbamyl or $C_1$–$C_6$-alkoxycarbonyl, $R^4$ is $C_1$–$C_6$-alkyl, $C_1$–$C_6$-alkoxy, halogen, preferably chlorine, or nitro, p is 0, 1 or 2, Z is O or S, $R^5$ is hydrogen or $C_1$–$C_6$-alkyl, preferably methyl, $R^6$ is halogen, preferably chlorine, or nitro, and q is 0, 1, 2, 3 or 4.

Specific examples of suitable divalent radicals —X— are:

(VIIIa), (VIIIb), (VIIIc), (VIIId), (VIIIe), (VIIIf), (VIIIg), (VIIIh), (VIIIi), (VIIIk), (VIIIl),

—⌬—NH—CO—CO—NH—⌬—, (VIIIn)

—⌬—CONH—NH—CO—⌬—, (VIIIo)

(VIIIp), $-\overset{H}{N}-CO-⌬-CO\overset{H}{N}-$, (VIIIq)

$-\overset{H}{N}CO-CO-\overset{H}{N}-$, (VIIIr)

—N=CH—⌬—CH=N—, (VIIIs)

$-\overset{O}{\overset{\|}{C}}-NH-⌬-NH-\overset{O}{\overset{\|}{C}}-$, (VIIIt)

(VIIIu)

and (VIIIv)

the benzene and naphthalene rings being unsubstituted or substituted by halogen, such as chlorine or bromine, nitro, $C_1$–$C_6$-alkyl and/or $C_1$–$C_6$-alkoxy. The rings are preferably unsubstituted or substituted by chlorine, bromine, methyl, ethyl, methoxy and/or ethoxy.

Preferred bisisoindoline pigments are those of the formula (IX)

(IX)

where the radicals $A^1$ are identical or different radicals of the formula

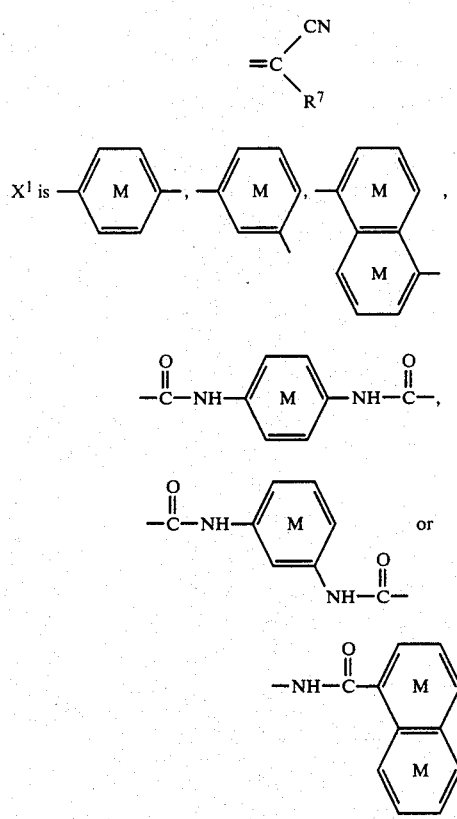

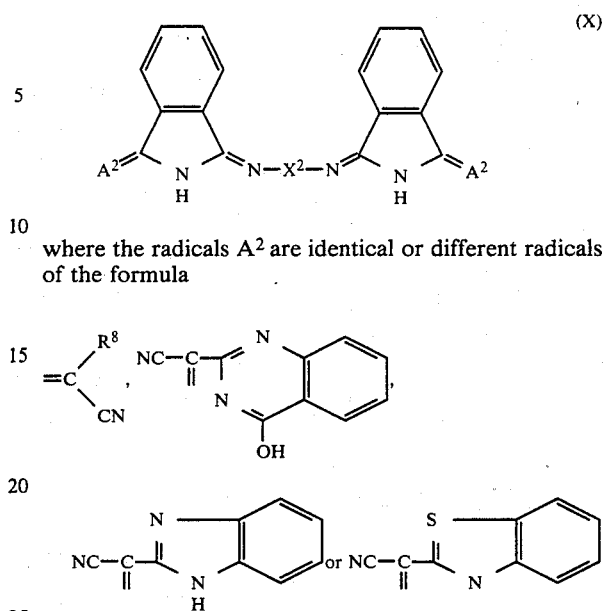

$R^7$ is cyano, carbamyl, $C_1$–$C_4$-alkylcarbamyl, phenylcarbamyl, the phenyl radical being unsubstituted or substituted by chlorine, bromine, $C_1$–$C_4$-alkyl, nitro, $C_1$–$C_4$-alkoxy or $C_1$–$C_4$-alkoxycarbonyl,

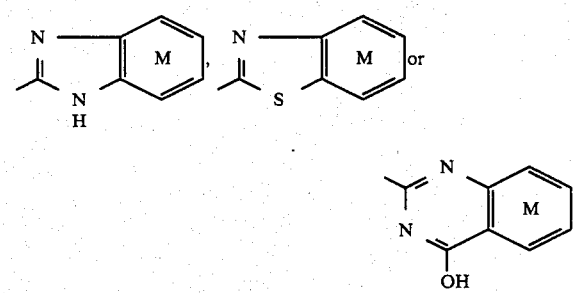

and M has the above meanings.

Particularly preferred bisisoindoline pigments are those of the formula (X)

where the radicals $A^2$ are identical or different radicals of the formula $X^2$ is 1,4- or 1,3-phenylene which is unsubstituted or substituted by methyl, ethyl, methoxy, ethoxy, chlorine or bromine, and $R^8$ is cyano, carbamyl, N-methylcarbamyl or N-ethylcarbamyl or is phenylcarbamyl which is substituted by chlorine, bromine, methyl, methoxy or carbomethoxy.

Of particular interest are the compounds of the formulae (I), (IX) and (X) in which both radicals A, $A^1$ or $A^2$ are identical.

Very particularly noteworthy bisisoindoline pigments are those of the formula (XI)

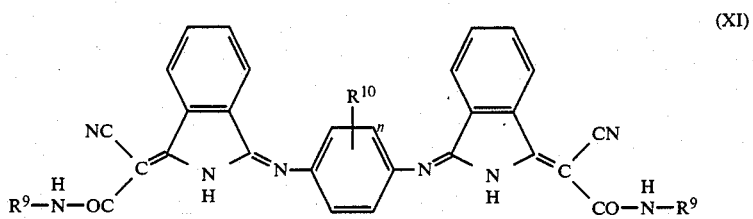

where $R^9$ is methyl or ethyl, $R^{10}$ is methyl, ethyl, methoxy, ethoxy or chlorine and n is 0, 1 or 2, and, when n is 2, the radicals $R^{10}$ may be identical or different.

Specific examples of $C_1$–$C_6$-alkyl are methyl, ethyl, n- and isopropyl, n- and isobutyl, but-2-yl, tertbutyl, pentyl, hexyl and 2,2-dimethylbutyl, $C_1$–$C_4$-alkyl being preferred.

Examples of suitable $C_1$–$C_6$-alkoxy radicals are methoxy, ethoxy, n- and isopropoxy, n- and isobutoxy, pentyloxy and hexyloxy, $C_1$–$C_4$-alkoxy being preferred and methoxy and ethoxy being particularly preferred.

The compounds of the formula (I) can, depending on the radical —X— (formulae (VIIIa) to (VIIIb)), be prepared by stepwise reaction of a compound of the formula

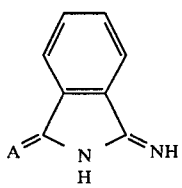
(XII)

with a diamine of the formula H₂N—X—NH₂ (XIII) or, in the case of the radicals X of the formulae (VIIIq) and (VIIIr), by reaction with a hydrazide of the corresponding dicarboxylic acid with elimination of ammonia.

Compounds (I) in which X is a radical of the formulae (VIIIt) to (VIIIv) can be obtained by stepwise reaction of a compound (XII) with the corresponding diisocyanate.

Compounds of the formula (I) in which X is a radical of the formula (VIIIq), (VIIIr) or (VIIIs) are also obtainable by reacting a compound of the formula

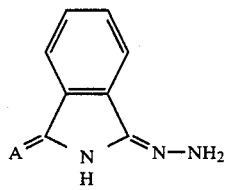
(XIV)

with the corresponding terephthaloyl chloride, with oxalyl chloride or with the corresponding terephthalaldehyde.

The reactions are advantageously carried out in an inert organic solvent at from 120° to 150° C., preferably from 50° to 120° C.

Suitable organic solvents are alcohols, such as methanol, ethanol, amyl alcohol or glycol monoalkyl ethers, aromatic, such as chlorobenzene, nitrobenzene or toluene, amidic solvents, such as formamide, N,N-dimethylformamide or N-methylpyrrolidone, and acids, such as formic acid or acetic acid.

For the reactions with diisocyanates, aromatic hydrocarbons, such as xylene, toluene, chlorobenzene or nitrobenzene, or N,N-dimethylformamide can be used.

Asymmetric compounds (I), ie. those in which the two radicals A are different, are obtained by condensation of mixtures of the compounds of the formula (XII).

Such asymmetric compounds (I) can also be prepared by reacting a compound of the formula (XII) with a nitroamino compound H₂N—X—NO₂ (XIIIa) to give

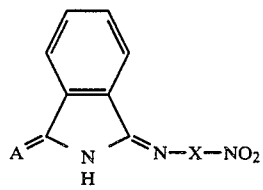
(XV)

which is reduced to the corresponding amino compound and then condensed with a further compound (XII) (in which the radical A differs from the radical A in the formula XV) to give the asymmetric compound (I).

The salts or complexes of the compounds of the formula (I) are prepared by conventional methods, for example by heating the compound with the corresponding metal salt in N,N-dimethylformamide, N-methylpyrrolidone or formamide at elevated temperatures (about 140° C.) for some time (about 5–10 hours).

The compounds of the formula (I) are obtained in a form suitable for use as a pigment, or can be converted to a suitable form by conventional after-treatment methods, for example by milling with or without milling assistants, such as inorganic salts, in the presence or absence of a solvent, such as toluene, xylene, dichlorobenzene or N-methylpyrrolidone. The color strength and transparency of the pigment can be influenced by varying the after-treatment.

The colorants of the formula (I) are lightfast and fast to migration and are therefore suitable for a very wide range of pigment applications. For example, they can be used for the preparation of very fast pigmented systems, such as mixtures with other substances, formulations, coatings, printing inks, colored paper and colored macromolecular substances. Mixtures with other substances may be, for example, mixtures with inorganic white pigments, such as titanium dioxide (rutile) or with cement. Formulations are, for example, flush pastes containing organic liquids or pastes and fine pastes with water, dispersants and, if required, preservatives. The term coatings covers, for example, physically or oxidatively drying surface coatings, baking finishes, reactive coatings, two-component coatings, emulsion paints for weather-resistant coatings, and distempers. Printing inks are those used for printing paper, textiles and tin plate. The macro-molecular substances may be of natural origin, such as rubber, obtained by chemical modification, eg. cellulose acetate, cellulose butyrate or rayon, or produced synthetically, eg. polymers, polyadducts and polycondensates. Examples are thermoplastic materials, such as polyvinyl chloride, polyvinyl acetate, polyvinyl propionate, polyolefins, eg. polyethylene, nylons, nylon superpolymers, polymers and copolymers of acrylates, methacrylates, acrylonitrile, acrylamide, butadiene and styrene, and polyurethanes and polycarbonates. The substances pigmented with the claimed products may be in any form.

The pigments of the formula (I) are moreover very waterfast, oilfast, acidfast, limefast, alkalifast and solventfast, fast to overcoating, overspraying and sublimation, heat-resistant and resistant to vulcanization, have a very high color strength and are readily dispersible in plastic materials.

The Examples which follow illustrate the invention. Parts are by weight.

EXAMPLE 1

45 parts of 1-imino-3-(cyano-N-methylcarbamylmethylene)-isoindoline and 11 parts of p-phenylenediamine in 700 parts of glacial acetic acid are stirred for 5 hours at 100° C. The mixture is cooled to 70° C. and then filtered, and the residue is washed with glacial acetic acid and methanol and dried to give 47 parts of a compound of the formula

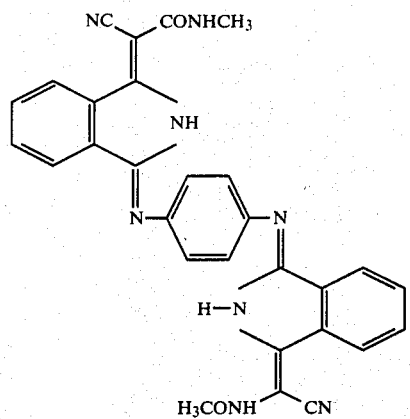

(XVI)

which, when incorporated into surface coatings, gives deep, lightfast, high-hiding brilliant orange colorations.

EXAMPLES 2-56

The procedure described in Example 1 is followed, except that, instead of 1-imino-3-(cyano-N-methylcarbamylmethylene)-isoindoline and p-phenylenediamine, isoindoline compounds of the formula

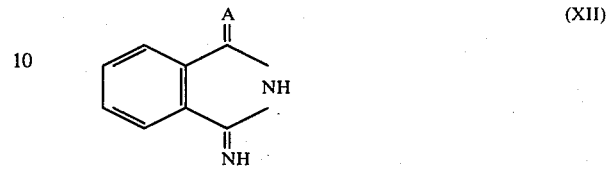

(XII)

and diamines of the formula $$H_2N-X-NH_2 \qquad (XIII)$$

where A and —X— have the meanings stated in the Table below, are used. The resulting pigments give colorations having the hues stated in column 4 when incorporated into coatings, and have similar properties.

| Example | A | —X— | Hue |
|---|---|---|---|
| 2 | NC—C(=)—CONHCH₃ |  (Cl-phenyl) | yellow |
| 3 | " | (2,5-diCl-phenyl) | yellow |
| 4 | " | (CH₃-phenyl) | red |
| 5 | " | (OCH₃-phenyl) | red |
| 6 | " | (phenyl) | yellow |
| 7 | NC—C(=)—CONHC₂H₅ | (phenyl) | orange |
| 8 | " | (phenyl) | yellow |

-continued
| Example | A | —X— | Hue |
|---|---|---|---|
| 9 | 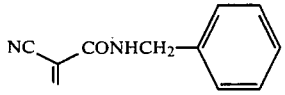 |  | yellow |
| 10 | 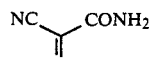 | 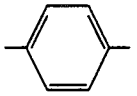 | yellow |
| 11 | " | 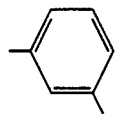 | yellow |
| 12 | 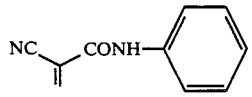 | 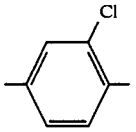 | red |
| 13 | 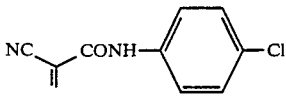 |  | red |
| 14 | " | 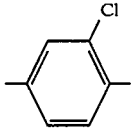 | red |
| 15 | " | 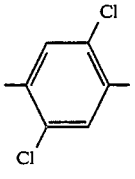 | red |
| 16 | " | 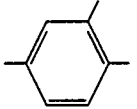 | red |
| 17 | " | 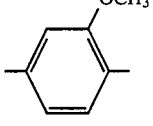 | maroon |
| 18 | 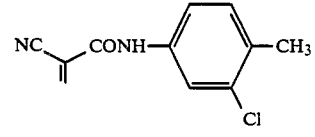 |  | red |
| 19 | 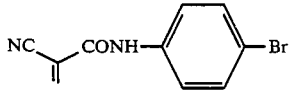 |  | orange |

-continued

| Example | A | —X— | Hue |
|---|---|---|---|
| 20 | NC-C(=CH)-CONH-(2-CO₂CH₃-phenyl) | 1,4-phenylene | yellow |
| 21 | NC-C(=CH)-CONH-(4-CH₃-phenyl) | 1,4-phenylene | red |
| 22 | NC-C(=CH)-CONH-(4-OCH₃-phenyl) | 1,4-phenylene | maroon |
| 23 | NC-C(=CH)-CONH-(1-naphthyl) | 1,4-phenylene | red |
| 24 | NC-C(=CH)-CONH-(1-naphthyl) | 1,3-phenylene | yellow |
| 25 | NC-C(=CH)-CONHCH₃ | 3,3'-dichloro-4,4'-biphenylene | orange |
| 26 | " | 1,5-naphthylene | orange |
| 27 | " | —C₆H₄—N=N—C₆H₄— | orange |
| 28 | " | —NH—COCO—NH— | yellow |
| 29 | " | —NHCO—C₆H₄—CONH— | yellow |
| 30 | " | —C₆H₄—NHCOCONH—C₆H₄— | yellow |

-continued

| Example | A | —X— | Hue |
|---|---|---|---|
| 31 | " | –C₆H₄–O–C₆H₄– (4,4'-diphenyl ether) | yellow |
| 32 | 2-(H-N-C(=O))-C₆H₄-N=C(CN)- (quinazolinone-type, cyanomethylene) | –C₆H₄– (1,4) | orange |
| 33 | 5-Br-2-(H-N-C(=O))-C₆H₃-N=C(CN)- | –C₆H₄– (1,4) | orange |
| 34 | 2-(H-N-C(=O))-C₆H₄-N=C(CN)- | –C₆H₄– (1,3) | yellow |
| 35 | NC–C(=CH–)–CONH–C₆H₅ | –C₆H₄– (1,4) | orange |
| 36 | " | –C₆H₄– (1,3) | yellow |
| 37 | NC–C(=CH–)–CONH–C₆H₄–Cl (3-Cl) | –C₆H₄– (1,4) | orange |
| 38 | " | 2-Cl-C₆H₃– (1,4) | orange |
| 39 | NC–C(=CH–)–CONH–C₆H₄–CF₃ (3-CF₃) | –C₆H₄– (1,4) | orange |
| 40 | NC–C(=CH–)–CONH–C₆H₄–NHCOCH₃ (1,4) | –C₆H₄– (1,4) | brown |
| 41 | NC–C(=CH–)–CONH–C₆H₂(OCH₃)₂(Cl) (2,5-(OCH₃)₂-4-Cl) | –C₆H₄– (1,4) | brown |

-continued
| Example | A | —X— | Hue |
|---|---|---|---|
| 42 |  |  | red |
| 43 |  |  | red |
| 44 |  |  | orange |
| 45 |  |  | yellow |
| 46 |  |  | yellow |
| 47 |  |  | yellow |
| 48 |  |  | yellow |
| 49 |  |  | brown |
| 50 |  |  | orange |
| 51 |  |  | brown |
| 52 |  |  | brown |

-continued

| Example | A | —X— | Hue |
|---|---|---|---|
| 53 | 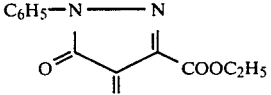 | 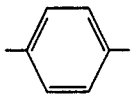 | brown |
| 54 | 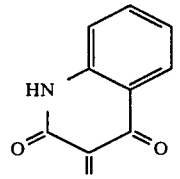 | 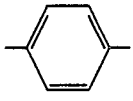 | brown |
| 55 | 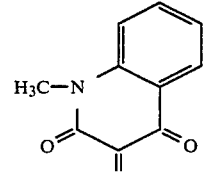 | 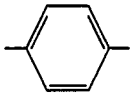 | brown |
| 56 | 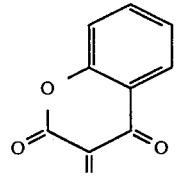 |  | red |

EXAMPLES 57 to 59

The procedure described in Example 1 is followed, except that, instead of 1-imino-3-(cyano-N-methylcarbamylmethylene)-isoindoline, the isoindoline compounds stated in column 2 of the Table below are reacted with p-phenylenediamine. The resulting pigments give colorations having the hues stated in column 3 when incorporated into coatings, and have similar properties.

| Example | Isoindoline compound | Hue |
|---|---|---|
| 57 | NC—C(=)—CONHC$_6$H$_5$ | red |
| 58 | NC—C(=)—CONHCH$_3$ | orange |
| 59 | NC—C(=)—CONH$_2$ | yellow |

EXAMPLE 60

45 parts of 1-imino-3-(cyano-N-methylcarbamylmethylene)-isoindoline and 16 parts of p-phenylenediisocyanate in 600 parts of dimethylformamide are stirred for 5 hours at 150° C. The mixture is cooled to 70° C. and then filtered, and the residue is washed with dimethylformamide and methanol and dried to give 40 parts of a compound of the formula

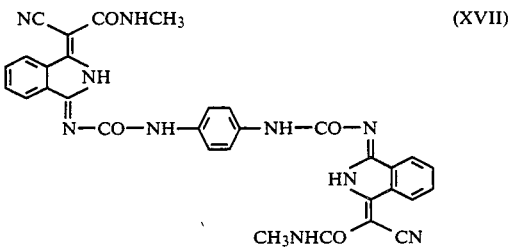

(XVII)

which, when incorporated into coatings, gives deep, high-hiding red colorations possessing good fastness to migration.

EXAMPLES 61–67

The procedure of Example 60 is followed, except that, instead of 1-imino-3-(cyano-N-methylcarbamylmethylene)-isoindoline and p-phenylene diisocyanate, isoindoline compounds of the formula XI and diisocyanates of the formula $$O=C=N-X^1-N=C=O,$$

where A and $X^1$ have the meanings given in the Table below, are used. The pigments color coatings in the hues stated in column 4. The pigment properties are similar to those of the pigment obtained as described in Example 60.

| Example | A | $-\overset{O}{\underset{\|}{C}}-NH-X^1-NH-\overset{O}{\underset{\|}{C}}-$ | Hue |
|---|---|---|---|
| 61 | 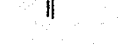 | 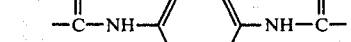 | red |
| 62 | 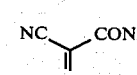 | " | brown |
| 63 |  | " | orange |
| 64 | 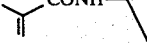 |  | brown |
| 65 |  |  | orange |
| 66 | " |  | yellow |
| 67 | 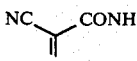 |  | red |

Examples of use (a) Finish 10 parts of the colorant obtained as described in Example 1 and 95 parts of a baking finish mixture containing 70% of coconut alkyd resin (dissolved in xylene to give a 60% strength solution) and 30% of melamine resin (dissolved in butanol/xylene to give a solution of about 55% strength) are milled in an attrition mill. After application, and baking for 30 minutes at 120° C., orange full-shade coatings possessing good lightfastness and fastness to overspraying are obtained. Mixing in titanium dioxide gives orange white reductions. If the colorants described in Examples 2 to 67 are used, coatings possessing similar hues and similar properties are obtained.

(b) Plastic 0.5 parts of the colorant obtained as described in Example 1 is applied onto 100 parts of commodity grade polystyrene granules by tumbling, and the colored granules are homogenized by extrusion at from 190° to 195° C. Lightfast orange extrudants are obtained. If a mixture consisting of 0.5 part of colorant and 1 part of titanium dioxide is used, high-hiding orange colorations are obtained. If the pigments obtained as described in Examples 2 to 67 are employed, similar colorations are obtained.

(c) Printing ink 8 parts of the pigment obtained as described in Example 1, 40 parts of a rosin modified with phenol/formaldehyde, and from 55 to 65 parts of toluene are mixed thoroughly in a dispersing unit. The resulting orange toluene-based gravure printing ink gives lightfast prints. Similar results are obtained if the colorants for Examples 2 to 67 are used.

We claim:

1. A bisisoindoline pigment of the formula:

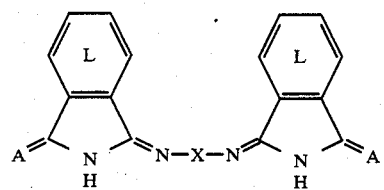

wherein A= is a methylene-active radical of the formula

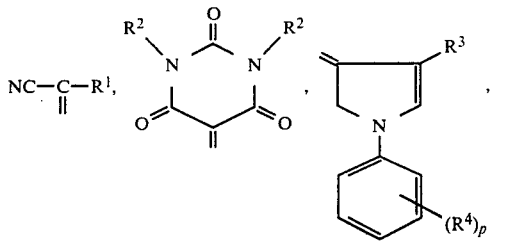

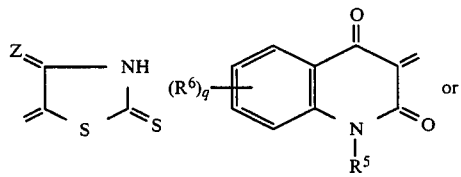

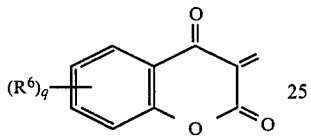

the two radicals A being identical or different, and $R^1$ is cyano; carbamyl which is unsubstituted or substituted by $C_1-C_6$-alkyl, benzyl, naphthyl or phenyl, the three last mentioned radicals being unsubstituted or substituted by chlorine, bromine, $C_1-C_6$-alkyl, $C_1-C_6$-alkoxy, nitro, trifluoromethyl, $C_1-C_6$-alkylcarbonyl, cyano, $C_1-C_6$-alkylamino, benzoylamino, phthalimidyl, carbamyl or $C_1-C_6$-alkoxycarbonyl; $C_1-C_6$-alkylcarbonyl; benzoyl, $C_1-C_6$-alkoxycarbonyl, benzyloxycarbonyl or phenoxycarbonyl, where benzoyl, benzyl and phenoxy are unsubstituted or substituted by halogen, nitro, $C_1-C_6$-alkyl, $C_2-C_7$-alkanoylamino or phthalimidyl; phenyl which is unsubstituted or substituted by halogen, nitro, trifluoromethyl or cyano; or a heterocyclic radical of the formula

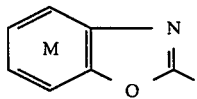

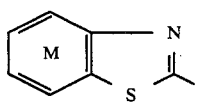

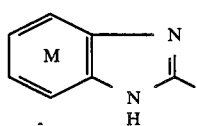

or

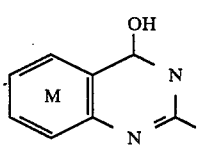

where the rings M are each unsubstituted or substituted by halogen, nitro, $C_1-C_6$-alkyl or $C_1-C_6$-alkoxy; the radicals $R^2$ independently of one another are each hydrogen or $C_1-C_6$-alkyl, or are each phenyl which is unsubstituted or substituted by halogen, $C_1-C_6$-alkyl, $C_1-C_6$-alkoxy, nitro, or are each α- or β-naphthyl; $R^3$ is $C_1-C_6$-alkyl, amino, benzoylamino, carbamyl or $C_1-C_6$-alkoxycarbonyl; $R^4$ is $C_1-C_6$-alkyl, $C_1-C_6$-alkoxy, halogen or nitro; $R^5$ is hydrogen or $C_1-C_6$-alkyl; $R^6$ is halogen or nitro; Z is O or S; p is 0, 1 or 2 and q is 0, 1, 2, 3 or 4, wherein —X— is

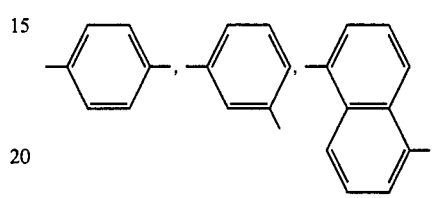

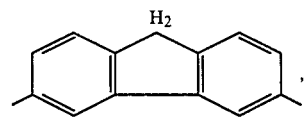

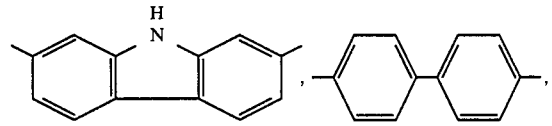

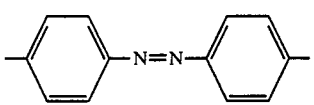

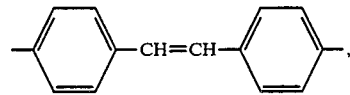

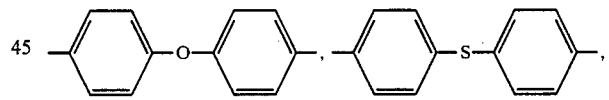

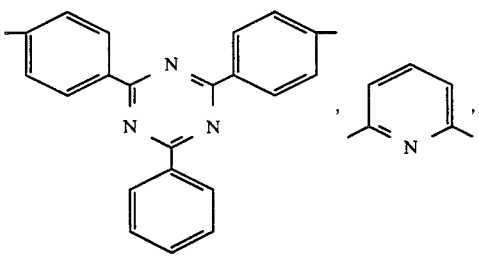

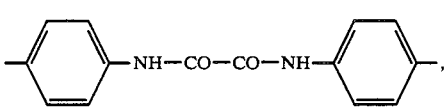

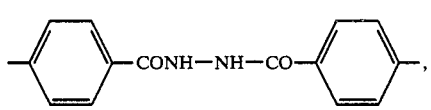

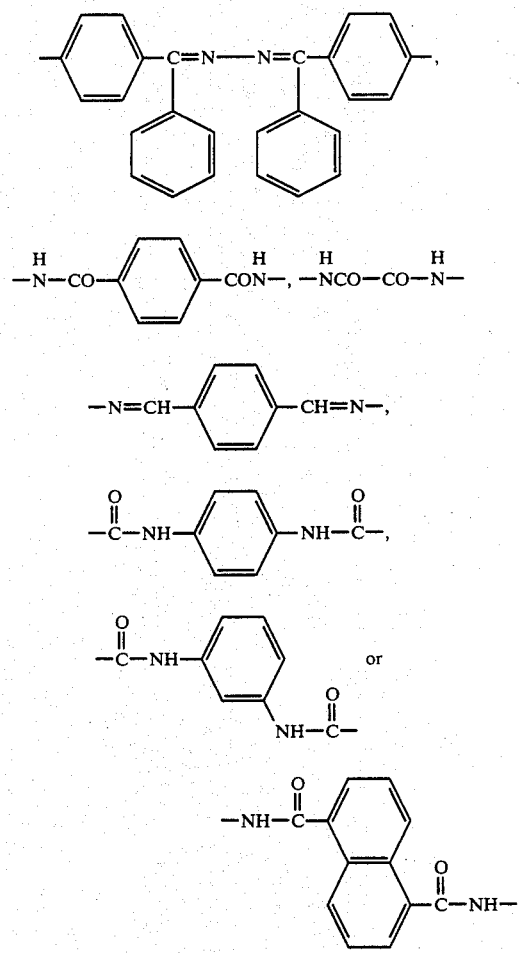

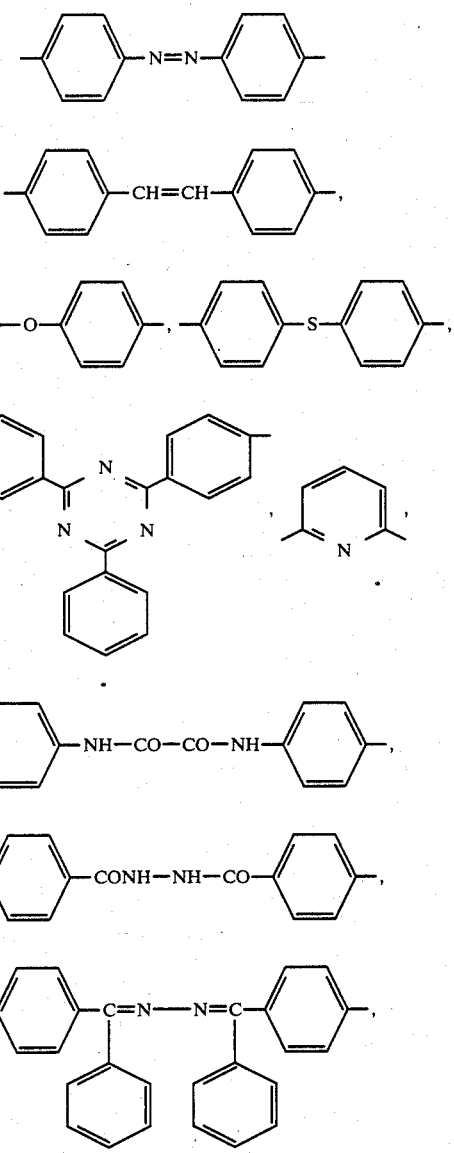

the benzene and naphthalene rings being unsubstituted or substituted by halogen, nitro, $C_1$-$C_6$-alkyl or $C_1$-$C_6$-alkoxy, and rings L are monosubstituted, disubstituted, trisubstituted or tetrasubstituted by halogen, $C_1$-$C_6$-alkyl, $C_1$-$C_6$-alkoxy, nitro or carbamyl.

2. A bisisoindoline pigment as claimed in claim 1, wherein the two radicals A are identical.

3. A bisindoline pigment as claimed in claim 1, wherein —X— is

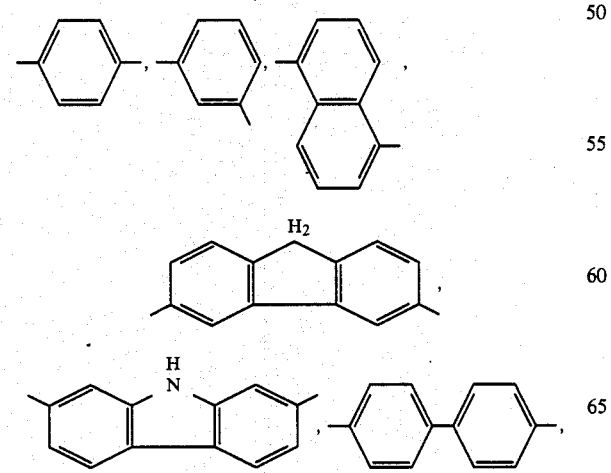

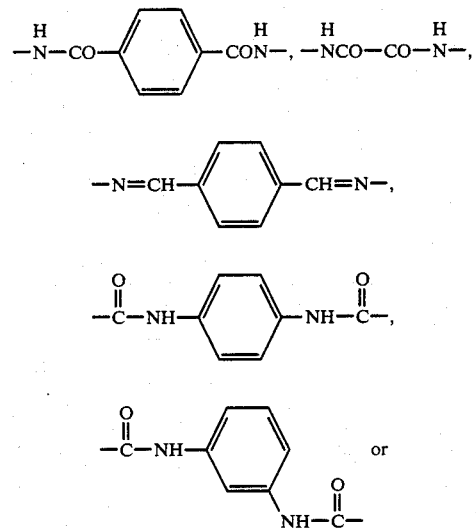

-continued

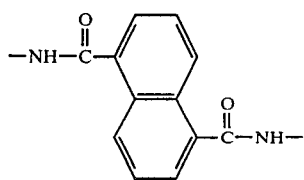

the benzene and naphthalene rings being unsubstituted or substituted by halogen, nitro, $C_1-C_6$-alkyl or $C_1-C_6$-alkoxy.

4. A bisindoline pigment as claimed in claim 3, wherein —X— is

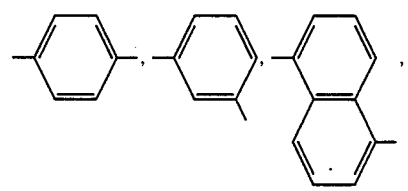

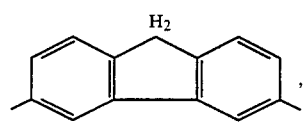

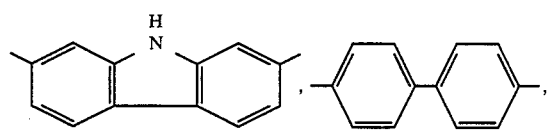

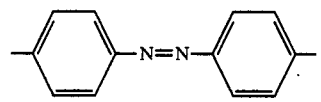

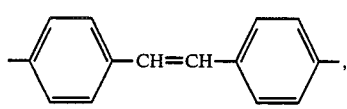

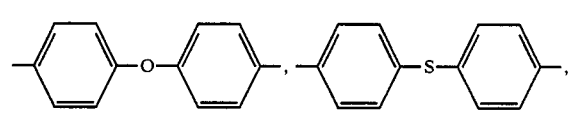

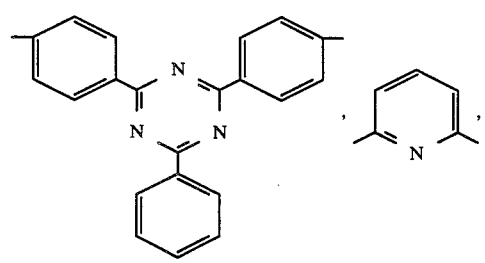

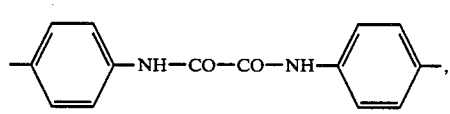

-continued

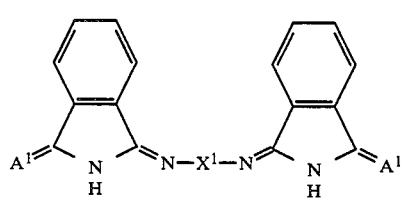

the benzene and naphthalene rings being unsubstituted or substituted by halogen, nitro, $C_1-C_6$-alkyl or $C_1-C_6$-alkoxy.

5. A bisisoindoline pigment as claimed in claim 1, wherein halogen is chlorine or bromine.

6. A bisisoindoline pigment as claimed in claim 1, of the formula where the radicals $A^1$ are identical or different radicals of the formula $X^1$ is

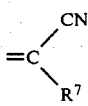

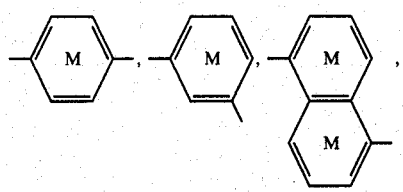

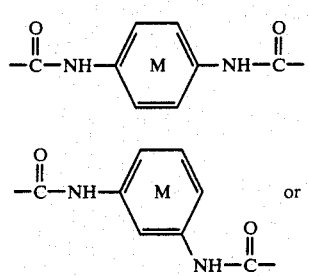

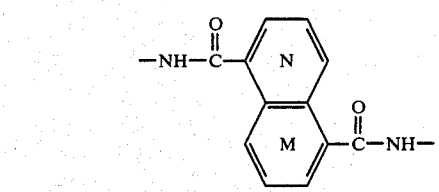

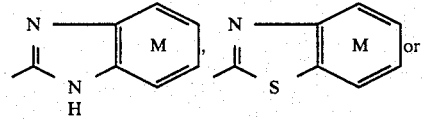

$R^7$ is cyano, carbamyl, $C_1$-$C_4$-alkylcarbamyl, phenylcarbamyl, the phenyl radical being unsubstituted or substituted by chlorine, bromine, $C_1$-$C_4$-alkyl, nitro, $C_1$-$C_4$-alkoxy or $C_1$-$C_4$-alkoxycarbonyl,

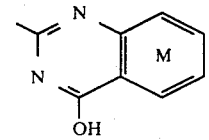

and the rings M are unsubstituted or substituted by chlorine, bromine, nitro, $C_1$-$C_6$-alkyl or $C_1$-$C_6$-alkoxy.

7. A bisisoindoline pigment as claimed in claim 6, wherein the rings M are unsubstituted or substituted by chlorine, bromine, methyl, ethyl, methoxy or ethoxy.

8. A bisisoindoline pigment as claimed in claim 6, wherein the two radicals $A^1$ are identical.

9. A bisisoindoline pigment as claimed in claim 1, of the formula

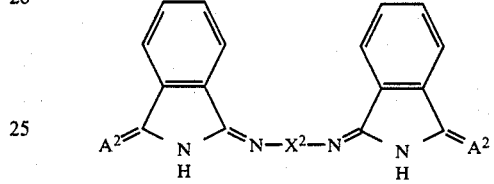

where the radicals $A^2$ are identical or different radicals of the formula

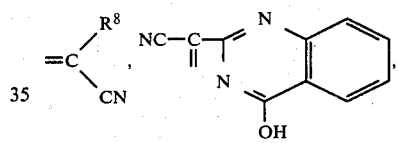

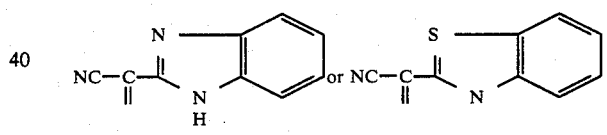

$X^2$ is 1,4- or 1,3-phenylene which is unsubstituted or substituted by methyl, ethyl, methoxy, ethoxy, chlorine or bromine, and $R^8$ is cyano, carbamyl, N-methylcarbamyl or N-ethylcarbamyl or is phenylcarbamyl which is substituted by chlorine, bromine, methyl, methoxy or methoxycarbonyl.

10. A bisisoindoline pigment as claimed in claim 9, wherein the two radicals $A^2$ are identical.

11. A bisisoindoline pigment as claimed in claim 1, of the formula

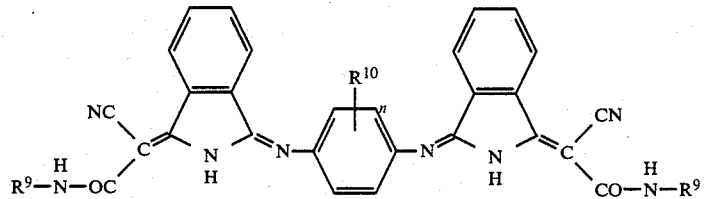

where $R^9$ is methyl or ethyl, $R^{10}$ is methyl, ethyl, methoxy, ethoxy or chlorine and n is 0, 1 or 2, and, when n is 2, the radicals $R^{10}$ are identical or different.

* * * * *